Patented May 19, 1931

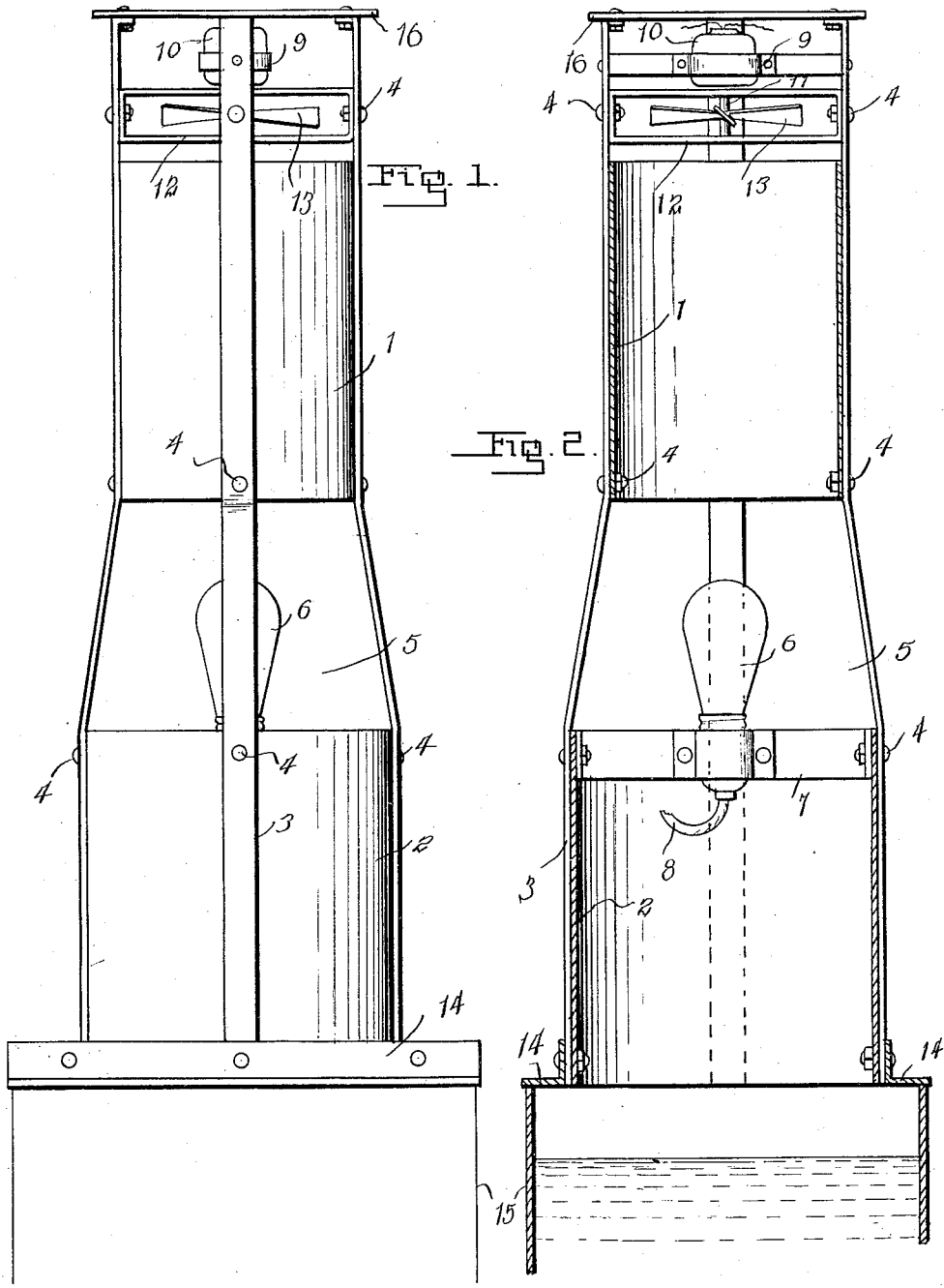

1,805,581

UNITED STATES PATENT OFFICE

WILLIAM W. HESS, OF ROBINSON, ILLINOIS

INSECT DESTROYER

Application filed July 11, 1928. Serial No. 291,969.

The present invention is directed to improvements in insect destroyers.

The primary object of the invention is to provide a device of this character so constructed that insects, whether of the flying or crawling species, will be trapped and exterminated.

Another object of the invention is to provide a device of this character wherein an illuminating element is employed to attract the insects at night, the construction being such that the insects after reaching a certain point will be precipitated by a blast of air into a vessel containing a destroying medium.

Another object of the invention is to provide a device of this character which is simple in construction, efficient in operation, and one which can be manufactured at a very small cost.

With these and other objects in view, this invention resides in the novel features of construction, formation, combination and arrangement of parts to be hereinafter more fully described, claimed and illustrated in the accompanying drawings, in which:—

Figure 1 is a side elevation of the device.

Figure 2 is a vertical sectional view therethrough.

Referring to the drawings, 1 and 2 designate, respectively, upper and lower open ended drums preferably formed from sheet metal, the former being spaced above and in direct alignment with the latter. The drum 1 is of less diameter than the diameter of the drum 2, and in order to maintain the drums spaced, a plurality of metal strips 3, preferably four in number are provided and are secured to the respective drums by bolts 4.

Since the drum 1 is spaced from the upper end of the drum 2, a gap 5 is provided between said drums and in which is located the incandescent bulb 6 supported by a bracket 7 fitted in the upper end of the drum 2 and secured therein by a pair of the bolts 4, current being furnished to the bulb through the conductor 8.

Fixed to the upper end of a pair of the strips 3 is bracket 9 which supports an electric motor 10, the shaft 11 thereof being journaled in a frame 12 secured in the upper end of the drum 1 by a pair of the bolts 4, said shaft having fixed thereto a fan 13.

Secured to the drum 2 at the lower end thereof is a pair of horizontally disposed angle iron bars 14 which are adapted to rest upon a vessel 15 in which is contained water having a film of kerosene thereon, which is well known will destroy insects.

It will be obvious that when the fan is in motion that the blast of air created thereby will be directed from the upper drum 1 into the lower drum 2, and the inserts attracted by the light from the bulb 6 will enter the gap whereupon the air blast will force the insects into the vessel to be destroyed.

If desired a cover plate 16 may be secured to the upper ends of the strips 3 to protect the motor from rain.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

1. An insect destroyer, comprising a lower drum, an upper drum, strips connecting the drums to hold the same in spaced relation and having their upper ends extended above the upper drum, a bracket carried by the lower drum, and an illuminating element supported by the bracket and extended into the space between said drums, a bracket supported by the extended ends of a pair of strips, a motor supported thereby, a fan disposed above the upper drum and driven by the motor for creating a blast of air in the upper drum for discharge therefrom into the lower drum, and means carried by the lower drum for supporting the same upon a vessel adapted to contain a destroying liquid.

2. An insect destroyer comprising upper and lower open ended cylindrical drums, the upper drum being of less diameter than the lower drum, parallel vertically disposed metal strips secured to the sides of each drum, and extending throughout the length of each drum, said strips maintaining the drums spaced apart and reinforcing the drums, horizontally disposed angle iron bars secured to the lower ends of said strips, a vessel for containing a destroying liquid, said angle iron bars supporting the lower drum upon the top of said vessel, the upper ends of said strips extending above the upper drum, a cover plate carried by the upper ends of said strips spaced above said upper drum, a horizontal bar carried by said strips between said cover plate and said upper drum, a motor carried by said horizontal bar, a fan operated by the motor and spaced above said upper drum, and an incandescent lamp carried by the lower drum and disposed between both drums.

In testimony whereof I affix my signature.

WILLIAM W. HESS. [L. S.]